(12) United States Patent
Shinba

(10) Patent No.: US 6,710,580 B2
(45) Date of Patent: Mar. 23, 2004

(54) METHOD AND APPARATUS FOR OVERLOAD-CONTROLLING INVERTER POWER GENERATION APPARATUS

(75) Inventor: Kaoru Shinba, Numazu (JP)

(73) Assignee: Kokusan Denki Co., Ltd., Shizuoka-ken (JP)

( * ) Notice: Subject to any disclaimer, the term of this patent is extended or adjusted under 35 U.S.C. 154(b) by 119 days.

(21) Appl. No.: 10/014,999

(22) Filed: Dec. 11, 2001

(65) Prior Publication Data

US 2002/0074974 A1 Jun. 20, 2002

(30) Foreign Application Priority Data

Dec. 14, 2000 (JP) ......................... 2000/380684

(51) Int. Cl.$^7$ ........................ H02H 7/06; H02H 11/00; H02M 5/45; H02M 5/42
(52) U.S. Cl. ..................... 322/37; 363/37; 363/98
(58) Field of Search ............... 322/24, 26, 28, 322/25, 37; 363/98, 37, 34, 36, 95, 97, 41

(56) References Cited

U.S. PATENT DOCUMENTS

| | | | |
|---|---|---|---|
| 4,052,659 A | | 10/1977 | Fletcher et al. ............... 363/57 |
| 4,527,214 A | | 7/1985 | Hattori et al. ................ 361/96 |
| 4,615,000 A | * | 9/1986 | Fujii et al. ................... 363/41 |
| 4,628,395 A | | 12/1986 | Sugishima ................... 361/18 |
| 5,990,654 A | * | 11/1999 | Skibinski et al. ........... 318/800 |
| 5,998,880 A | * | 12/1999 | Kumar ...................... 290/40 B |
| 6,278,622 B1 | * | 8/2001 | Shimazaki et al. ........... 363/37 |
| 6,556,458 B2 | * | 4/2003 | Ohmura et al. ............... 363/37 |
| 6,570,779 B2 | * | 5/2003 | Shimazaki et al. ........... 363/41 |

FOREIGN PATENT DOCUMENTS

JP 410234195 A * 9/1998

* cited by examiner

Primary Examiner—Nicholas Ponomarenko
Assistant Examiner—Julio C. Gonzalez
(74) Attorney, Agent, or Firm—Pearne & Gordon LLP (57) ABSTRACT

A method of controlling an inverter power generation apparatus adapted to stop an operation of an inverter by stopping supplying a drive signal to a switch circuit of the inverter when an overload continuation time exceeds a first setting time in the state where a load current detected by a load current detector is equal to or more than a first overload judgment value and equal to or less than a second overload judgment value, to stop the operation of the inverter when the overload continuation time exceeds a second overload judgment value set in accordance with an output voltage of the inverter in the state where the load current exceeds the second overload judgment value and the output voltage of the inverter is higher than a short circuit judgment value and to stop the operation of the inverter immediately when the load current exceeds the second overload judgment value and the output voltage of the inverter is equal to or less than the short circuit judgment value whereby the inverter can be positively protected while an induction motor having a larger starting current flowing therethrough.

12 Claims, 7 Drawing Sheets

METHOD AND APPARATUS FOR OVERLOAD-CONTROLLING INVERTER POWER GENERATION APPARATUS

TECHNICAL FIELD OF THE INVENTION

This invention relates to an inverter power generation apparatus comprising an AC generator driven by an internal combustion engine at various rotational speeds and an inverter to convert an output of the AC generator into an AC output of arbitrary frequency and a method of controlling the inverter power generation apparatus on its overload.

BACKGROUND OF THE INVENTION

An inverter power generation apparatus has been used for a power generation apparatus driven by an internal combustion engine as a primer.

In general, the inverter power generation apparatus comprises an AC generator driven by the internal combustion engine, a DC power supply section to convert an output voltage of the AC generator into a DC voltage and an inverter to convert an output voltage of the DC power supply section into an AC output of predetermined frequency.

The inverter comprises a bridge type switch circuit to convert the output of the DC power supply section into the AC voltage, a filter circuit to remove a harmonic component from the AC voltage output from the switch circuit, load connection terminals having the output of the filter circuit applied across the terminals and PWM control means to control the switch elements of the switch circuit in the form of pulse width modulation (referred to as PWM later) so as to output the AC voltage of predetermined waveform through the load connection terminals.

The DC power supply section comprises a rectifier to rectify the output of the AC generator and a smoothing capacitor connected across the DC output terminals of the rectifier to generate a DC voltage across the smoothing capacitor.

The bridge-type switch circuit comprises a plural of switch arms connected in parallel to each other and each having an upper arm switch element and a lower arm switch element connected in series to each other and an upper arm feedback diode and a lower arm feedback diode connected in reverse parallel to the upper arm switch element and the lower arm switch element, respectively. A pair of DC input terminals are led out of a common connection point of both ends of the switch arms while AC output terminals are led out of the connection point of the upper and lower arm switch elements of each of the switch arms.

The PWM control means to control the switch elements of the switch circuit serves to output from the inverter circuit the AC voltage of intermittent waveform having a duty ratio "D" changed for every PWM cycle in accordance with an instant value of the AC output voltage applied through the load connection terminals to the load by carrying out the on-off of the current flowing through the pair of switch elements located at the diagonal position of the bridge type switch circuit, for example at predetermined timing with a drive signal (PWM signal) of pulse waveform obtained by modulating in the PWM form at least one of drive signals to be applied to the pair of the switch elements.

The AC voltage of intermittent waveform output from the switch circuit is converted into an AC output voltage of smooth waveform having a harmonic component removed by the filter circuit.

In the inverter generator apparatus, there is provided overload protection means to stop the operation of the inverter when the load current gets excessive in order to protect the switch circuit of the inverter from the overload current. The overload protection means of the prior art inverter generator apparatus comprises a current transformer to detect the load current flowing from the inverter through the load connection terminals, an overload signal generation circuit to generate an overload signal when the load current detected by the current transformer is compared with a limit value and the detected overload current exceeds the limit value and inverter operation stop means to stop the operation of the inverter by stopping supplying the drive signal to the switch circuit of the inverter when the state where the overload signal is generated continues for a setting time.

With the inverter generator apparatus used, since the DC voltage output from the DC power supply section is converted into the AC voltage of arbitrary frequency, the AC voltage of predetermined frequency can be obtained from the load connection terminals in spite of the revolutional speed of the generator. Also, the AC voltage of arbitrary magnitude can be obtained by controlling the duty ratio changed for every PWM cycle in the PWM control.

As aforementioned, in the prior art inverter generator apparatus, the overload protection control is performed by stopping the operation of the inverter when the state where the load current flowing from the inverter through the load connection terminals exceeds the limit value continues for the setting time whereby the switch elements of the switch circuit of the inverter are protected from the over current, but since the operation of the inverter is stopped by the overload protection control working with the large rush current flowing through an induction load such as an induction motor when it starts to be driven, the load might be unable to be started.

In order to solve the problems, it will be considered that the limit value of the load current in the overload protection control is set to be higher than the rush current of the induction motor, but since the thus set limit value prevents the protection operation from being made even though the over current flows for a long time when the load other than the induction load is driven whereby the inverter cannot be positively protected.

SUMMARY OF THE INVENTION

Accordingly, it is a principal object of the invention to provide a method of controlling an inverter power generation apparatus on its overload adapted to positively protect an inverter used for both of an induction load and a load other than the induction load.

It is another object of the invention to provide an apparatus for controlling an inverter power generation apparatus on its overload adapted to positively protect an inverter used for both of an induction load and a load other than the induction load.

The invention is applied to a method of overload controlling an inverter power generation apparatus comprising an AC generator driven by an internal combustion engine, a rectifier to rectify an output of the AC generator and an inverter to convert an output voltage of the rectifier into an AC voltage of constant frequency. In the overload control method of the invention, a value of the load current flowing through the inverter is compared with an allowable threshold value and at least one overload judgment value set to be smaller than the allowable threshold value and the operation of the inverter is stopped immediately when the overload current exceeds the allowable threshold value. Also, in case that the load current is equal to or less than the allowable threshold value, but exceeds the overload judgment value, when a time set in accordance with the value of the overload judgment values elapses after the overload current exceeds the overload judgment value, the operation of the inverter is stopped.

Thus, the induction load through which the large current flows when it starts to be driven can be driven without any trouble by appropriately setting the overload judgment value and the times determined in accordance with the overload judgment values.

In the state of driving the induction load and the load other than the induction load, when the load current gets excessive and exceeds the allowable threshold value, the operation of the inverter can be immediately stopped. Thus, the inverter can be positively protected from the overload.

An inverter power generation apparatus for carrying out the aforementioned method may comprise a load current detector to detect a load current flowing through an inverter, an instant stop command generation circuit to generate a stop command to instruct the inverter to be stopped immediately when the value of the load current detected by the load current detector is compared with an allowable threshold value and the load current exceeds the allowable threshold value, at least one overload stop command generation circuit to perform a time interval operation for a time set in accordance with the value of the overload judgment value when the value of the load current detected by the load current detector is compared with the overload judgment value set at a value smaller that the allowable threshold value and is detected to exceeds the overload judgment value and to generate a stop command to instruct the inverter to be stopped when the time interval operation is completed and inverter stop means to stop the operation of the inverter when the stop command is generated from either of the instant stop command generation circuit and the overload stop command generation circuit.

BRIEF DESCRIPTION OF THE DRAWINGS

The above and other objects and features of the invention will be apparent from the detailed description of the preferred embodiments of the invention, which are described and illustrated with reference to the accompanying drawings, in which.

DETAILED DESCRIPTION OF PREFERRED EMBODIMENTS

Now the embodiments of the invention will be described with reference to the drawings hereinafter.

Figure 1:
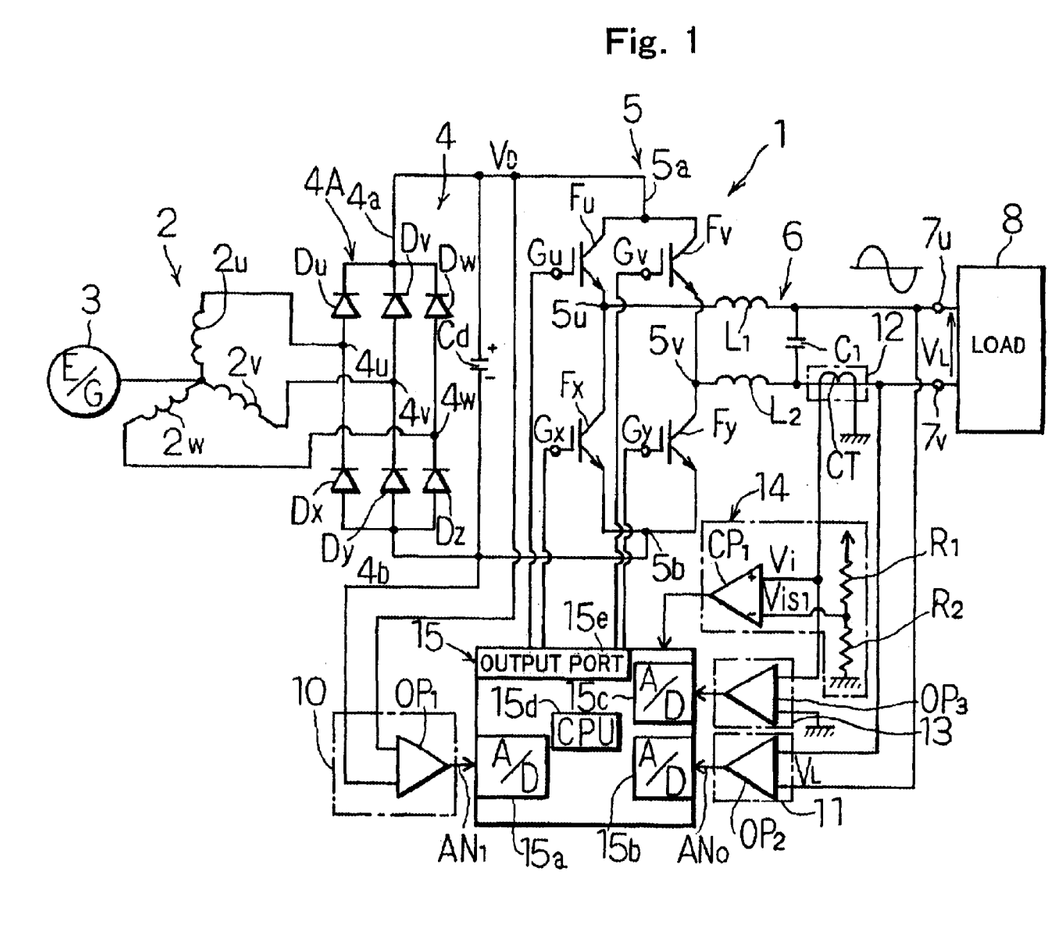
FIG. 1 is a schematic diagram of an inverter power generation apparatus to which the invention can be applied.

FIG. 1 shows an example of a construction of the inverter power generation apparatus to which the invention is applied. A three-phase magneto AC generator 2 driven by an internal combustion engine (E/G) 3 comprises a multi-pole magnet rotor not shown and a stator having generation coils 2u through 2w connected in three-phase. The rotor is provided on a crankshaft of an internal combustion engine (E/G) 3.

A rectifier 4A comprises diodes Du through Dw and Dx through Dz connected in the form of three-phase bridge. Three-phase output terminals of the generator 2 are connected to three-phase AC input terminals 4u through 4w of the rectifier 4A, respectively, while a smoothing capacitor Cd is connected across DC output terminals 4a and 4b of the rectifier 4A. A DC power supply section 4 is formed by the rectifier 4A and the smoothing capacitor Cd.

A H-bridge type switch circuit 5 comprises a switch arm formed of a series circuit of an upper arm switch element Fu and a lower arm switch element Fx and a switch arm formed of a series circuit of an upper arm switch element Fv and a lower arm switch element Fy and these switch arms are connected in parallel to each other.

In this embodiment, each of the switch elements may comprise an insulation gate type bipolar transistor (IGBT). AC output terminals 5u and 5v are led out of the connection point of emitters of the IGBTs as the switch elements Fu and Fv and collectors of the IGBTs as the switch elements Fx and Fy, respectively, while DC input terminals 5a and 5b are led out of the common connection point of collectors of the IGBTs as the switch elements Fu and Fv and the common connection point of emitters of the IGBTs as the switch elements Fv and Fy, respectively.

The switch circuit 5 may comprise other on-off controllable switch elements such as a MOSFET or a bi-polar power transistor.

The input terminals 5a and 5b of the switch circuit 5 are connected to the output terminals 4a and 4b of the rectifier 4A while the pair of output terminals 5u and 5v are connected to a pair of load connection terminals 7u and 7v through a low-pass passage type filter circuit 6 which may be formed of inductances L1 and L2 and a capacitor C1. A load 8 is connected across the load connection terminals 7u and 7v.

A power supply voltage detection circuit 10 serves to detect a DC power supply voltage output from the DC power supply section 4 and an output voltage detection circuit 11 serves to detect an AC output voltage output from the filter circuit 6. The detection circuits 10 and 11 may comprise an amplifier circuit formed of operational amplifiers OP1 and OP2, respectively.

A load current detector 12 serves to detect a load current of an inverter and, in the illustrated embodiment, may comprise a current transformer CT provided on a line of connection of an output terminal of the filter circuit 6 and the load connection terminal 7v. A load current detection signal Vi obtained from the load current detector 12 is input to a non-inversion input terminal of a comparator CP1 and also to an amplifier circuit 13 formed of an operational amplifier OP3. To an inversion terminal of the comparator CP1, there is input a first overload judgment signal Visl obtained by dividing an output voltage of a not shown DC constant voltage supply circuit by a divider circuit formed of a series circuit of resistors R1 and R2. The first overload judgment signal Visl provides a first overload judgment value isl to define the minimum value of an overload range of the inverter and the output voltage of the comparator CP1 is changed from a high level state to a low level state when the load current of the inverter exceeds the first overload judgment value.

In the illustrated embodiment, a first overload judgment signal generation circuit may be formed of the resistors R1 and R2 and the not shown DC constant voltage supply circuit. In the illustrated embodiment, overload detection means 14 (overload signal generation means) to generate an overload signal or detect the overload state of the inverter when the load current of the inverter exceeds the first overload judgment value may be formed of the first overload judgment signal generation circuit and the comparator CP1. In the embodiment, lowering the level of the output voltage from the comparator CP1 is used for the overload signal.

The outputs of the power supply voltage detection circuit 10, the output voltage detection circuit 11, the amplifier circuit 13 and the overload detection circuit 14 are input to a controller 15 to control the switch circuit 5. The controller 15 may comprise an A/D converter 15a to convert the output of the power supply voltage detection circuit 10 into a digital signal, an A/D converter 15b to convert the output of the output voltage detection circuit 11 into a digital signal, an A/D converter 15c to convert the load current detection signal input through the amplifier circuit 13 into a digital signal, a microcomputer having a CPU 15d and RAM, ROM or the like not shown and an output port 15e to apply PWM signals Gu, Gv, Gx and Gy to the control terminals of the switch elements Fu, Fv, Fx and Fy (bases of the IGBTs, in the illustrated embodiment) in accordance with a drive command signal output from the CPU 15d.

In the embodiment of FIG. 1, the inverter to convert the DC voltage output by the DC power supply section 4 into the AC voltage of constant frequency is formed of the switch circuit 5, the filter circuit 6, the power supply voltage detection circuit 10, the output voltage detection circuit 11, the load current detector 12, the amplifier circuit 13 to amplify the load current detection signal, the overload detection circuit 14 and the controller 15. The inverter power generation apparatus 1 is formed by the inverter, the AC generator 2 and the DC power supply section 4.

In the inverter power generation apparatus of FIG. 1, the AC voltage output by the AC generator 2 is converted into a DC power supply voltage VD by the DC power supply section 4 formed of the rectifier 4A and the smoothing capacitor Cd and the DC power supply voltage VD is input to the switch circuit 5 of the inverter.

The CPU 15d of the controller 15 reads data AN1 of the DC power supply voltage VD applied from the DC power supply section 4 through the operational amplifier OP1 and the A/D converter 15a and reads instant data AN0 indicating the voltage across the load connection terminals 7u and 7v through the operational amplifier OP2 of the output voltage detection circuit 11 and the A/D converter 15b. The CPU 15d arithmetically operates the duty ratio "D" of the PWM cycle based on these data and applies the PWM signals to the control terminals of the switch elements of the switch circuit 5 so that the output of the switch circuit is made intermittent by the obtained duty ratio "D". Thus, the AC voltage of intermittent waveform having the duty ratio changed for every PWM cycle in accordance with the instant value of the AC output voltage applied through the load connection terminals 7u and 7v to the load 8 is output from the switch circuit 5.

FIGS. 2A through 2D show the PWM signals Gu, Gy, Gx and Gv applied to the control terminals of the switch elements Fu, Fy, Fx and Fv from the controller 15 in case that the AC output voltage of sine waveform should be obtained from the load connection terminals. The switch elements Fu, Fy, Fx and Fv are in the on state when the PWM signals Gu, Gy, Gx and Gv are at high level while they are in the off state when the PWM signals Gu, Gy, Gx and Gv are at low level.

Figures 2A, 2B:
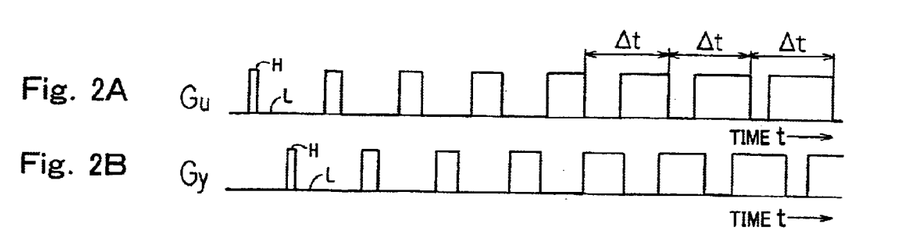
FIGS. 2A through 2H are time charts showing drive signals applied to the switch circuit of the inverter for the inverter power generation apparatus of FIG. 1 and timing of an on-off control action of the switch elements.
Figure 2C:
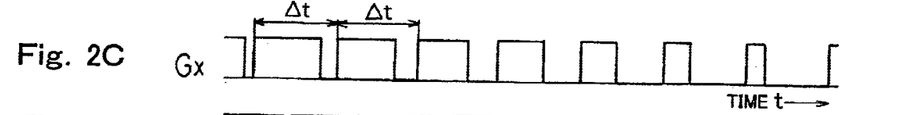
Figure 2D:
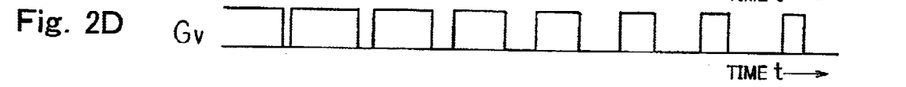
Figures 2E, 2F:
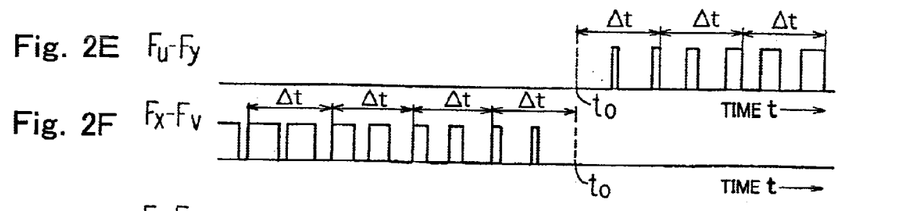
Figures 2G, 2H:
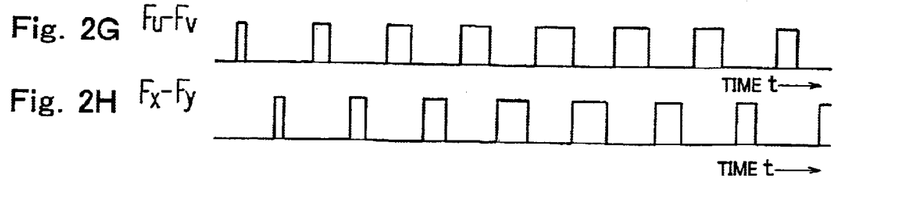

FIGS. 2E and 2F show a timing at which the pairs of switch elements (Fu, Fy) and (Fx, Fv) located at the diagonal position of the H-bridge switch circuit 5 get the on state at the same time while FIGS. 2G and 2H show a timing at which the upper arm switch elements (Fu, Fv) of the H-bridge get the on state at the same time and a timing at which the lower arm switch elements (Fx, Fy) of the H bridge get the on state at the same time.

In case that the waveform of the AC output voltage to be output through the load connection terminals 7u and 7v should be a sine waveform, a positive half wave voltage of intermittent waveform (identical to that shown in FIG. 2E) having a duty ratio changed for every PWM cycle $\Delta t$ in proportion to the instant value of the AC voltage of sine wave is output from the switch circuit 5 by producing a period of FIG. 2E where the pair of switch elements Fu and Fy located at the diagonal position get the on state at the same time by applying the PWM signals Gu and Gy of pulse waveform to the gates of the switch elements Fu and Fy, respectively, during the period of the positive half wave of the AC output voltage.

A negative half wave voltage of intermittent waveform (identical to that shown in FIG. 2F) having a duty ratio changed for every PWM cycle $\Delta t$ in proportion to the instant value of the AC voltage of sine wave is output from the switch circuit 5 by producing a period of FIG. 2F where the pair of switch elements Fx and Fv located at the diagonal position get the on state at the same time by applying the PWM signals Gx and Gv of pulse waveform to the gates of the switch elements Fx and Fv, respectively, during the period of the negative half wave of the AC output voltage.

The AC voltage of intermittent waveform output from the switch circuit 5 is applied across the load connection terminals 7u and 7v to the load 8 after it is converted into the smoothed AC output voltage of sine waveform through the filter circuit 6.

The PWM signals comprise a signal of pulse waveform generally having a first state (a Hi level state in the embodiment of FIG. 2) and a second state (a Lo level state in the embodiment of FIG. 2) alternately obtained. The switch elements of the switch circuit 5 get the on state during the period of the first state of the PWM signals while they get the off state during the period of the second state thereof.

In the embodiment illustrated in FIG. 2, the PWM signals Gu and Gx are pulse signals having a phase reverse to each other and being generated with the constant PWM cycle $\Delta$ t while the PWM signals Gy and Gv are pulse signals having a reverse to each other and delayed for predetermined phase relative to the PWM signals Gu and Gx whereby the AC voltage of intermittent waveform having the duty ratio changed for every PWM cycle Δ t is output from the switch circuit 5 by changing the duty ratio of each of the PWM signals for every PWM cycle Δ t .

In the inverter power generation apparatus of FIG. 1, as shown in FIGS. 2G and 2H, the switching pattern of the switch elements of the switch circuit 5 is so determined that there happen the period during which the upper arm switch elements Fu and Fv of the bridge of the switch circuit 5 get the on state at the same time and the period during which the lower arm switch elements Fx and Fy of the bridge get the on state at the same time.

With the switching pattern so determined, since the capacitor C1 of the filter circuit 6 can be discharged during the simultaneous on state of the upper arm switch elements Fu and Fv and during the simultaneous on state of the lower arm switch element Fx and Fy, there can be obtained the AC output voltage of smoother waveform across the load connection terminals 7u and 7v.

In the description, what is meant by the duty ratio D of the PWM control is a ratio of the period during which the output voltage or output current of the switch element is at Hi level or the switch elements at the diagonal position of the switch circuit 5 are in the on state at the same time relative to every PWM cycle Δ t .

In case that the controller 15 is formed by using the microcomputer, every PWM cycle can be detected by counting the pulses generated with constant period within the microcomputer by a PWM cycle counter and the time when every PWM cycle starts is set as the switching timing.

The microcomputer processes an internal interruption for every PWM cycle for each of the switch elements Fu, Fv, Fv and Fy, sets the on time of the switch elements at the PWM signal generating timers based on the duty ratio determined by reading it from a map with the internal interruption process and gets the first state (the Hi level state, for instance) of the potential at the drive command signal output port of the CPU 15d so that the drive command signals Gu, Gv, Gx and Gy of pulse waveform fare generated rom the output port.

Figure 3:
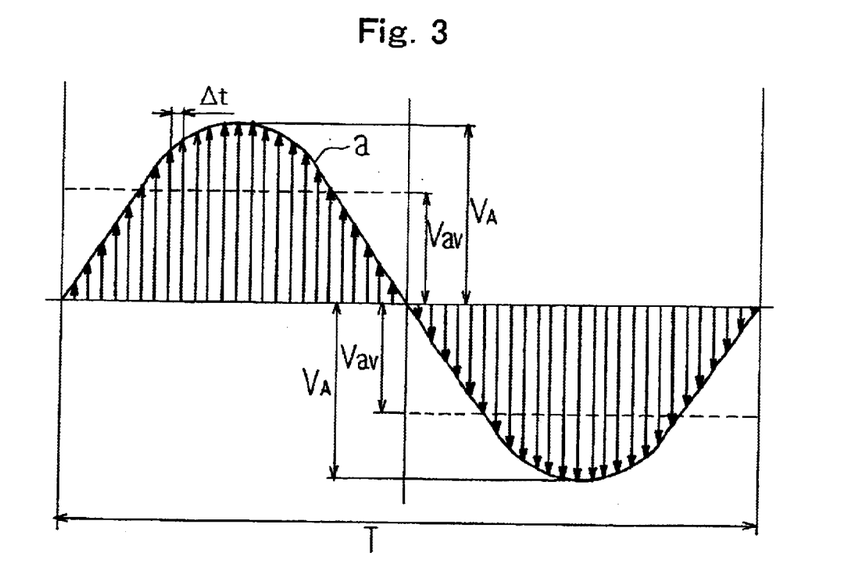
FIG. 3 illustrates a waveform of AC voltage obtained across the load connection terminals of the inverter power generation apparatus of FIG. 1 and internal interruption timing in the PWM control.

FIG. 3 shows a relationship of the internal interruption timing (the switching timing of the switch elements of the switch circuit) with the duty ratio of the PWM signals. In this figure, a reference "a" designates the waveform of the AC voltage obtained across the load connection terminals 7u and 7v, "Δ t" designates the PWM cycle, "VA" designates the rated value of the crest value of the AC voltage "a", "Vav" designates an average value of the AC voltage "a" and "T" designates a cycle of the AC voltage obtained across the load connection terminals.

The switch circuit 5 outputs the AC voltage of intermittent waveform having the duty ratio "D" changing for every PWM cycle in accordance with the instant value of the AC output voltage "a" obtained across the load connection terminals. The waveform of the AC voltage is so set that the sine wave AC voltage of one cycle is divided into n pieces so that the waveform of the AC voltage has the stepped waveform. There can be obtained across the load connection terminals 7u and 7v the sine wave output voltage of smoother waveform by passing the stepped waveform of the AC voltage through the filter circuit 6.

Supposed that the output voltage of the inverter power generation apparatus is the sine wave AC voltage, the reference duty ratio "Do" of the output of the inverter will be given as follows;

$$Do = \sin(2\pi n \, \Delta \, t/T) \tag{1}$$

Wherein "n" designates a numerical value indicating in what order the PWM cycle is from the zero cross point at the rising up of the waveform of the AC voltage and given by the counted value of the counter provided in the controller for counting the PWM cycle.

In the PWM control performed by the controller 15, the duty ratio "D" can be determined by multiplying the reference duty ratio "Do" given by the aforementioned formula (1) by a predetermined correction coefficient "Kv" changing with variation in the DC power supply voltage "VD".

Figure 4:
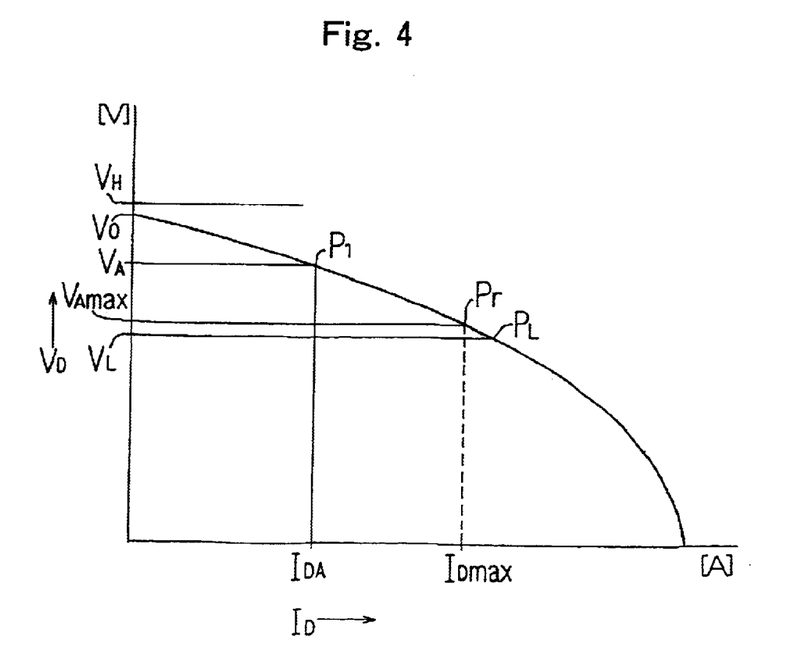
FIG. 4 illustrates a curve of an example of the output characteristic of the DC power supply section of the inverter power generation apparatus of FIG. 1.

The DC power supply voltage "VD" changes relative to the output current "ID" as indicated by a curve of FIG. 4, for instance. Supposed that the maximum rated value of the crest value of the AC output voltage obtained across the load connection terminals 7u and 7v is "VAmax", the operation point at that time is at the position "Pr" of FIG. 4 and the maximum rated load current gets the value indicated by "IDmax". The maximum rated load current "IDmax" is the maximum load current allowable for obtaining the AC voltage having no waveform distortion across the load connection terminals. As the load current exceeding the maximum rated load current "IDmax" flows, the waveform of the AC output voltage has the distortion waveform in which the peak portion of the waveform is crushed.

Supposed that the rated value of the crest value of the AC output voltage output from the inverter power generation apparatus is "VA" (>VAmax), the operation point at that time is at the position "P1" of FIG. 4 and the maximum rated load current gets the value indicated by "IDA". In case that the DC power supply voltage "VD" varies as in indicated in FIG. 4, the correction coefficient "KV" by which the reference duty ratio "Do" should be multiplied for obtaining the rated value of the crest value of the AC output voltage will be given as follows;

$$Kv = VA/VD \tag{2}$$

Thus, the duty ratio "D" of the PWM control in case that the rated value of the crest value of the AC output voltage is "VA" will be given as follows;

$$D = \sin(2\pi n \, \Delta \, t \, /T) \times (VA/VD) \tag{3}$$

In the inverter power generation apparatus of FIG. 1, the data "AN0" indicating the instant value of the AC voltage across the load connection terminals 7u and 7v is read in the CPU 15d and the duty ratio "D" is corrected so that when the data "AN0" is lower than the data indicating the rated value, the duty ratio "D" for the PWM control is made larger and when the data "AN0" is larger than the data indicating the instant value of the AC voltage across the load connection terminals 7u and 7v, the duty ratio "D" for the PWM control is made smaller whereby a deviation between the rated value and the output voltage detected by the output voltage detection circuit 11 is so controlled as to get closer to zero.

The duty ratio "D" obtained after this correction is made will be given as follows;

$$D' = D + G \times (ANS - AN0) \times Kc \tag{4}$$

Wherein "ANS" designates the rated value of each of the instant values of the AC output voltage and "G" designates a gain to determine the ratio of correction amount relative to a deviation between the rated value "ANS" and the value "AN0". The gain is usually set at the value of one or less. The coefficient "Kc" is one by which the correction value [G×(ANS−AN0)] of the instant value of the voltage across the load connection terminals should be multiplied for converting the correction value into the one having the duty ratio for that time and the coefficient "Kc" is a numerical value determined by "Kv".

The CPU 15d determines the duty ratio "D" by the formula (3) while using the reference duty ratio "Do" read from the ROM in accordance with the count value "n" of the PWM cycle counter whenever the PWM cycle is detected by the counter and the correction coefficient Kv obtained by the arithmetical operation on the formula (2) using the read data "AN1 (=VD)" of the DC power supply voltage or obtains the duty ratio "D" by reading it from the map for arithmetically operating the duty ratio previously stored in the ROM. The map for arithmetically operating the duty ratio used herein is a three-dimensional map providing a relation of the count value "n" of the counter, the data "AN1" of the output voltage of the rectifier and the duty ratio "D".

In case that the deviation between the voltage across the load connection terminals 7u and 7v and the rated value is controlled to be made zero, the PWM signal is applied to the switch elements of the switch circuit so that the output of the switch circuit 5 is controlled in the form of PWM with the duty ratio "D" corrected so as to have no deviation between the data "AN0" of the output voltage and the rated value using the formula (4).

Also, in the inverter power generation apparatus of FIG. 1, the overload control is performed in order to protect the inverter from the overload current. In the overload control of the prior art inverter power generation apparatus, when the state where the load current of the inverter becomes beyond the overcurrent judgment value continues for the setting time, the port of the CPU 15d gets the off state or the Enable/Disable signal has the state of Disable whereby the PWM signal stops being supplied to the switch elements of the switch circuit so as to interrupt the overcurrent. However, according to this method, in case that the load 8 is an inductive one such as an induction motor through which a large rush current flows when it starts, the overload protection control works due to this large rush current and thus the load might fail to start.

In the embodiment of the invention, in order to perform the overload control relative to the load current flowing through the inverter, a first overload judgment value and a second overload judgment value larger than the first one are determined, a short circuit judgment value is determined relative to the output voltage of the inverter and a first setting time and a second setting time having the length determined in accordance with the output voltage of the inverter are determined. In case that the value of the load current is between the first and second overload judgment values, the drive signal stops being supplied to the switch circuit 5 so that the operation of the inverter stops when the overload continuation time exceeds the first setting time. In case that the value of the load current exceeds the second overload judgment value, it is judged whether the output voltage of the inverter (the voltage across the load connection terminals 7u and 7v) is equal to or less than the short circuit judgment value or not in order to judge whether the cause of the excessive load current is a short circuit accident occurring on the output side of the inverter or not. As a result, in case that it is judged that the short circuit accident occurs, the drive signal immediately stops being supplied to the switch circuit 5 so that the operation of the inverter stops. In case that it is judged that no short circuit accident occurs, when the overload continuation time exceeds the second setting time set in accordance with the value of the output voltage of the inverter, the drive signal stops being supplied to the switch circuit 5 so that the operation of the inverter stops.

More particularly, in the overload control of this embodiment, when it is detected that the load current having the value exceeding the first overload judgment value flows through the inverter, the overload continuation time starts to be measured, it is judged whether the load current is beyond the second overload judgment value larger than the first overload judgment value or not and whether the output voltage of the inverter is equal to or less than the short circuit judgment value or not. In case that the value of the load current exceeds the second overload judgment value and the output voltage of the inverter is equal to or less than the short circuit judgment value, the operation of the inverter immediately stops. In case that the value of the load current is equal to or more than the first overload judgment value and equal to or less than the second overload judgment value, when the overload continuation time exceeds the first setting time, the operation of the inverter is stopped. In case that the value of the overload current exceeds the second overload judgment value and the output voltage of the inverter is higher than the short circuit judgment value, it is judged that the excessive overload current is not caused by the short circuit accident and the overload current is allowed to continue to flow until the overload continuation time exceeds the second setting time set in accordance with the output voltage of the inverter. Thus, the operation of the inverter stops when the overload continuation time exceeds the second setting time. The second setting time is so set as to get shorter as the output voltage of the inverter gets lower.

The first overload judgment value is the minimum value of the overload current allowed to flow through the inverter for the first setting time while the second overload judgment value is the maximum value of the overload current allowed to flow through the inverter for the first setting time. These first and second overload judgment values are appropriately set in accordance with the current capacity of the switch elements for the switch circuit of the inverter and the length of the first setting time.

The first setting time may be set at a constant value or be changed in accordance with the value of the detected load current. In other words, the first setting time may be so set that as the detected load current is larger, the first setting time gets shorter.

The short circuit judgment value is the judgment value for judging whether the output terminals of the power generation apparatus are in the state of being shorted or closer thereto and is set at a value further smaller than the minimum value of the voltage across the load connected across the output terminals of the inverter power generation apparatus when the load is in a transient state at the time of starting.

For instance, in case that the load of the inverter power generation apparatus is the induction motor, the short circuit judgment value is set at a value smaller than the minimum value of the voltage across the induction motor (the voltage across the output terminals of the inverter power generation apparatus) when the rush current flows through the induction motor at the time of starting.

With the aforementioned overload control performed, in case that the value of the overload current is within a range of being equal to or more than the first overload judgment value and equal to or less than the second overload judgment value, the operation of the inverter stops when the overload continuation time exceeds the first setting time. Thus, it will be noted that with the first and second overload judgment values set appropriately, the overload protection control operation for the load other than the induction load can be accomplished in the same manner as the prior art. Since the operation of the inverter can stop immediately when the value of the overload current exceeds the second overload judgment value and the value of the output voltage of the inverter is equal to or less than the short circuit judgment value, the inverter can be protected because the operation of the inverter stops immediately when the output terminals of the inverter gets the short circuit state or the state closer thereto.

In case that the value of the overload current exceeds the second overload judgment value and the value of the output voltage of the inverter is higher than the short circuit judgment value, the operation of the inverter stops when the overload continuation time exceeds the second setting time. Thus, with the second overload judgment value and the short circuit judgment value set at appropriate values, the induction load through which the large current flows at the time of starting can be driven without any trouble. For instance, as the second overload judgment value is set at a value higher than the peak value of the rush current flowing through the induction motor at the time of starting and the short circuit judgment value is set at a value lower than the minimum value of the voltage across both ends of the induction motor when the rush current flows therethrough, the induction motor can start without any trouble.

The overload control apparatus for carrying out the aforementioned method comprises a load current detector to detect the load current flowing through the load from the inverter, overload signal generation means to generate an overload signal when the value of the load current detected by the load current detector is equal to or more than the first overload judgment value, overload continuation time measurement means to measure the overload continuation time corresponding to a time elapsing after the overload signal is generated, overload current judgment means to judge whether the load current exceeds the second overload judgment value set at a value larger than the first overload judgment value when the overload signal is generated, short circuit judgment means to judge whether the value of the output voltage of the inverter is equal to or less than the short circuit judgment value when it is judged by the overload current judgment means that the value of the load current exceeds the second overload judgment value, short circuit inverter protection means to stop the operation of the inverter immediately when it is judged by the short circuit judgment means that the value of the output voltage of the inverter is equal to or less than the short circuit judgment value and overload inverter protection means to stop the operation of the inverter when the overload continuation time exceeds the first setting time in the state where it is judged by the overload current judgment means that the value of the load current is equal to or more than the first overload judgment value and equal to or less than the second overload judgment value and when the overload continuation time exceeds the second setting time in the state where it is judged by the overload current judgment means that the value of the load current exceeds the second overload judgment value and it is judged value by the short circuit judgment means that the value of the output voltage of the inverter is higher than the short circuit judgment value. The second setting time is so set as to get shorter as the output voltage gets lower.

Figure 5:
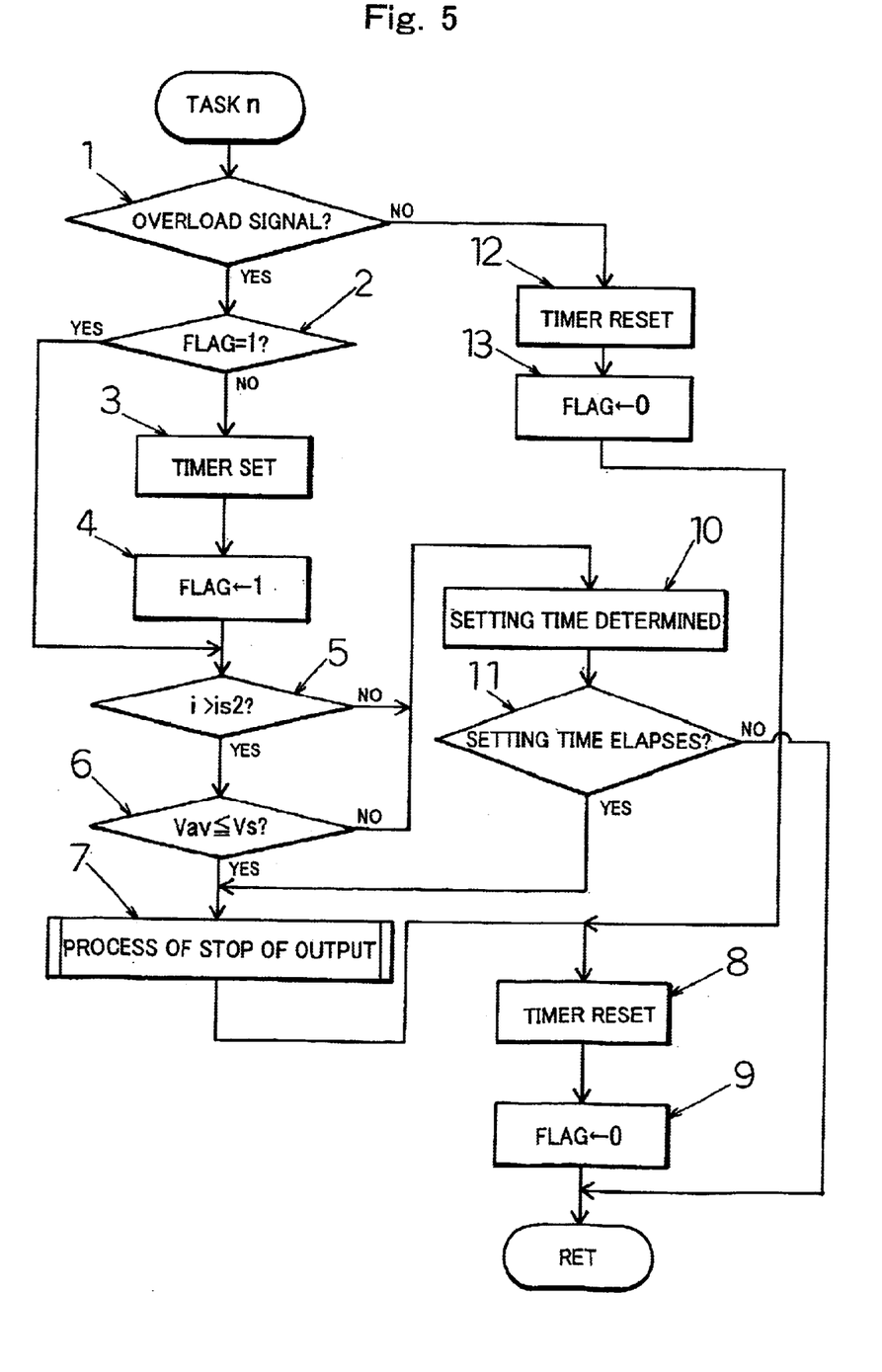
FIG. 5 is a flow chart illustrating a principal part of an algorithm of a program performed by a controller of the inverter power generation apparatus of FIG. 1.

An example of an algorithm of a program practiced by the CPU of the controller in case that the aforementioned overload control is performed is shown in FIG. 5. In this embodiment, the program practiced by the CPU is so constructed to perform a series of processes by a multitask technique which repeats much task in predetermined order. FIG. 5 illustrates a construction of one task "n" practiced by the CPU. In the step 1 of the task "n", it is judged whether the overload detection circuit 14 generates the overload signal or not. In case that the overload signal is generated, the program is advanced to the step 2 where it is judged whether the flag is set at 1. Since the flag is not set at 1 immediately after the overload signal is generated, the program is advanced to the step 3 where the timer provided in the microcomputer is set and in the step 4 the flag is set at 1. Thereafter, in the step 5, it is judged whether the detected value "i" of the load current exceeds the second overload judgment value "is2" or not. In case that the detected value of the load current exceeds the second overload judgment value, the program is advanced to the step 6 where it is judged whether the average value "Vav" of the output voltage "VL" of the inverter (the voltage across the load connection terminals 7u and 7v) is equal to or less than the short circuit judgment value "Vs" or not.

Figure 6A:
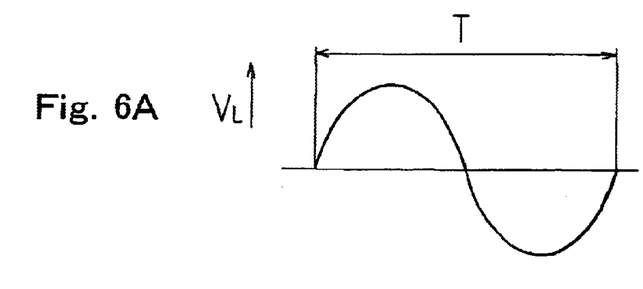
FIGS. 6A and 6B illustrate a waveform of an AC voltage obtained from the inverter power generation apparatus and a sampling timing when an average value of the AC voltage is determined.
Figure 6B:
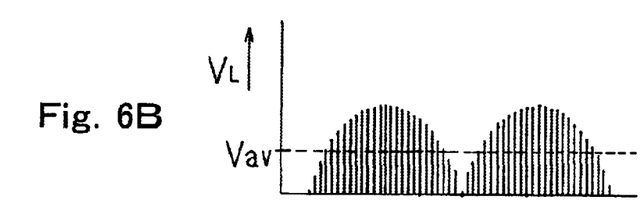

At any time, the CPU 15d performs such processes as it samples the instant value of the inverter output voltage "VL" of waveform as indicated in FIG. 6A, for example with a predetermined sampling cycle as shown in FIG. 6B, integrates the sampled voltage value over one cycle "T" of the voltage "VL" and arithmetically operates the average value "Vav" of the output voltage of the inverter by dividing the integrated value by the cycle "T". In the step 6, the thus obtained average value "Vav" of the output voltage "VL" of the inverter is compared with the short circuit judgment value (the average value of the output voltage when the load connection terminals are shorted or close to the short circuit) "Vs".

As a result, when it is judged that the average value "Vav" of the output voltage of the inverter is equal to or less than the short circuit judgment value "Vs" (when the load connection terminals are in the state of short circuit or close thereto so that the operation of the inverter is required to immediately stop), the program is advanced to the step 7 where the process is performed which immediately stops the supply of the drive signal to the switch circuit 5 so that the operation of the inverter stops. Thereafter, in the step 8, the timer is reset and then in the step 9, the flag is reset, which causes the program to be returned to the main routine.

In the step 5, it is judged that detected value "i" of the load current is equal to or less than the overload judgment value "is2" and, in the step 6, when it is judged that the average value "Vav" of the output voltage of the inverter exceeds the short circuit judgment value "Vs", the program is advanced to the step 10 where the setting time is determined in accordance with the detected value "i" of the load current and the average value "Vav" of the output voltage of the inverter.

In the process of the determination of the setting time in the step 10, the first setting time is set when the detected value "i" of the load current is equal to or less than the second overload judgment value "is2" (when the program is advanced from the step 5 to the step 10) and the second setting time is set when the detected value "i" of the load current exceeds the second overload judgment value "is2" and the average value "Vav" of the output voltage of the inverter exceeds the short circuit judgment value "Vs" (when the program is advanced from the step 6 to the step 10). The first setting time set when the detected value of the load current is equal to or less than the second overload judgment value may have a fixed value or vary in accordance with the value of the load current so as to get shorter as the load current gets larger.

The second setting time set when the detected value of the load current exceeds the second overload judgment value varies in accordance with the output voltage of the inverter in such a manner as it gets shorter as the output voltage of the inverter gets lower and it gets longer as the output voltage gets higher.

The process of the determination of the setting time in the step 10 may be performed whenever the task "n" is repeated, but in case that the already set setting time is not required to change in the practice of the next task "n" (in case that the condition for determining the setting time is not different from the one in the former task practiced), the program may be transferred to the next step 11 without any process for determining the setting time in the step 10.

After the setting times are determined in the step 10, it is judged in the step 11 whether the setting time elapses after the overload signal is generated or not. More particularly, it is judged whether the count value of the timer set in the step 3 to start the timer operation (the overload continuation time) exceeds the setting time (the first setting time or the second setting time) determined in the step 10 or not. Thus, when it is judged that the overload continuation time exceeds the setting time, the program is advanced to the step 7 where the operation of the inverter is stopped. When it is judged in the step 11 that the overload continuation time does not exceed the setting time, the program is returned to the main routine.

When it is judged in the step 1 that no overload current is generated, the program is advanced to the step 12 where the timer is reset, then in the step 13, the flag is rest to 0 and the program is returned to the main routine.

Figure 7:
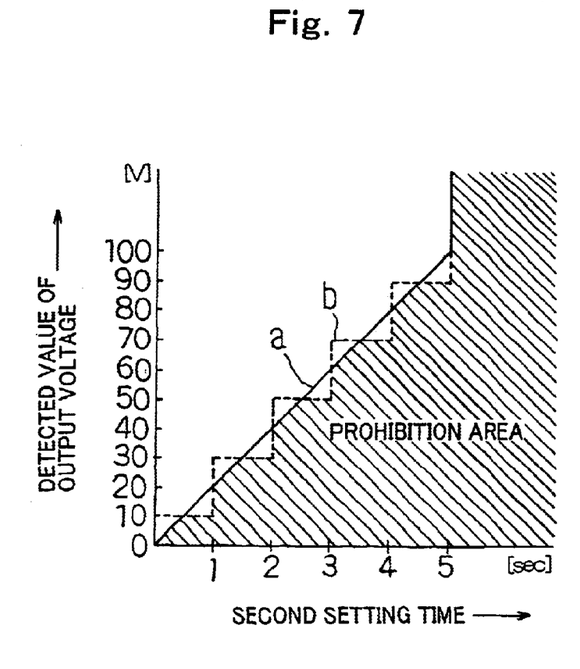
FIG. 7 illustrates the overload protection control performed in accordance with the algorithm of FIG. 5.

FIG. 7 shows an example of the overload protection operation in case that the load current exceeds the second overload judgment value in the embodiment. The horizontal axis of this figure indicates the second setting time while the longitudinal axis thereof indicates the detected value (average value) of the output voltage of the inverter. In FIG. 7, the folded line "a" indicates the actual detected voltage while the stepped line "b" indicates the relation between the setting time in the actual protection operation and the output voltage of the inverter. The area where the hatching is applied indicates the prohibition area where the operation of the inverter is forbidden.

In the embodiment of FIG. 7, as the short circuit judgment value is set at 10V and the detected average value of the output voltage of the inverter is within the range of 0V to 10V, the operation of the inverter is immediately stopped. As the average value of the output voltage of the inverter is within the range of 10V to 30V, the second setting time is set to one second and the operation of the inverter is stopped when one second elapses after the overload state is detected.

Similarly, when the average value of the output voltage of the inverter is within the range of 30V to 50V, 50V to 70V and 70V to 90V, respectively, the second setting time is set to 2 seconds, 3 seconds and 4 seconds, respectively. When the output voltage of the inverter is within the range of more than 90V, the second setting time is set to 5 seconds.

As aforementioned, when the load current exceeds the second overload judgment value and the output voltage of the inverter exceeds the short circuit judgment value, it is judged that the overload current is not caused by the short circuit accident and the overload current is allowed to flow until the overload continuation time reaches the second setting time, but when the overload continuation time exceeds the second setting time, the operation of the inverter is stopped. Thus, even the load such as the induction motor through which the large rush current flows when it starts can be driven without any trouble by setting the second overload judgment value and the short circuit judgment value at proper values, respectively.

In the aforementioned embodiment, the overload detection circuit 14 of FIG. 1 forms the overload signal generation means to generate the overload signal when the load current detected by the load current detector gets equal to or more than the first overload judgment value.

The overload continuation time measurement means to measure the overload continuation time which corresponds to the elapse time after the overload signal is generated is formed by the steps 1 through 4 and the steps 8 and 9 of FIG. 5.

The overload current judgment means to judge whether the load current exceeds the second overload judgment value set at a value larger than the first overload judgment value or not when the overload signal is generated is formed by the step 5 of FIG. 5.

The short circuit judgment means to judge whether the output voltage of the inverter is equal to or less than the set short circuit judgment value or not when it is judged by the overload current judgment means that the load current exceeds the second overload judgment value is formed by the step 6 and the short circuit inverter protection means to stop the operation of the inverter immediately when the output voltage of the inverter is equal to or less than the short circuit judgment value is formed by the steps 6 and 7.

The overload inverter protection means is formed by the steps 5 and 6, the steps 10 and 11 and the step 7, which serves to stop the operation of the inverter when the overload continuation time exceeds the first setting time in the state where it is judged by the overload current judgment means that the value of the load current is equal to or more than the first overload judgment value and is equal to or less than the second overload judgment value and when the overload continuation time exceeds the second setting time in the state where it is judged by the overload current judgment means that the value of the load current exceeds the second overload judgment value and it is judged by the short circuit judgment means that the output voltage of the inverter is higher than the short circuit judgment value.

As aforementioned, as the overload current judgment means, the short circuit judgment means, the short circuit inverter protection means and the overload inverter protection means are practiced by the software, the overload judgment value and the short circuit judgment value can be arbitrarily set on the software and therefore the overload protection operation characteristic for various loads can be easily set. This easily provides the inverter power generation apparatus that can be applied to various loads.

Although, in the illustrated embodiment, it is judged whether the overload current is caused by the short circuit accident or not by comparing the output voltage of the inverter with the short circuit judgment value when the load current exceeds the second overload judgment value, the operation of the inverter may be stopped immediately when the load current exceeds the allowable critical value by comparing the value of the load current flowing through the inverter with the allowable critical value and at least one overload judgment value set at a value smaller than the allowable critical value or the operation of the inverter may be stopped after the setting time set in accordance with the overload judgment value when it is judged that the load current is equal to or less than the allowable critical value and exceeds the overload judgment value.

In this manner, as the operation of the inverter is stopped when the setting time elapses after the overload is detected in the state where the load current is equal to or more than at least one overload judgment value and equal to or less than the allowable critical value and as the operation of the inverter is stopped immediately after the load current exceeds the allowable critical value, the inverter can be properly protected from the overload while the induction load is allowed to be driven by properly setting the overload judgment value and the allowable critical value.

Figure 8:
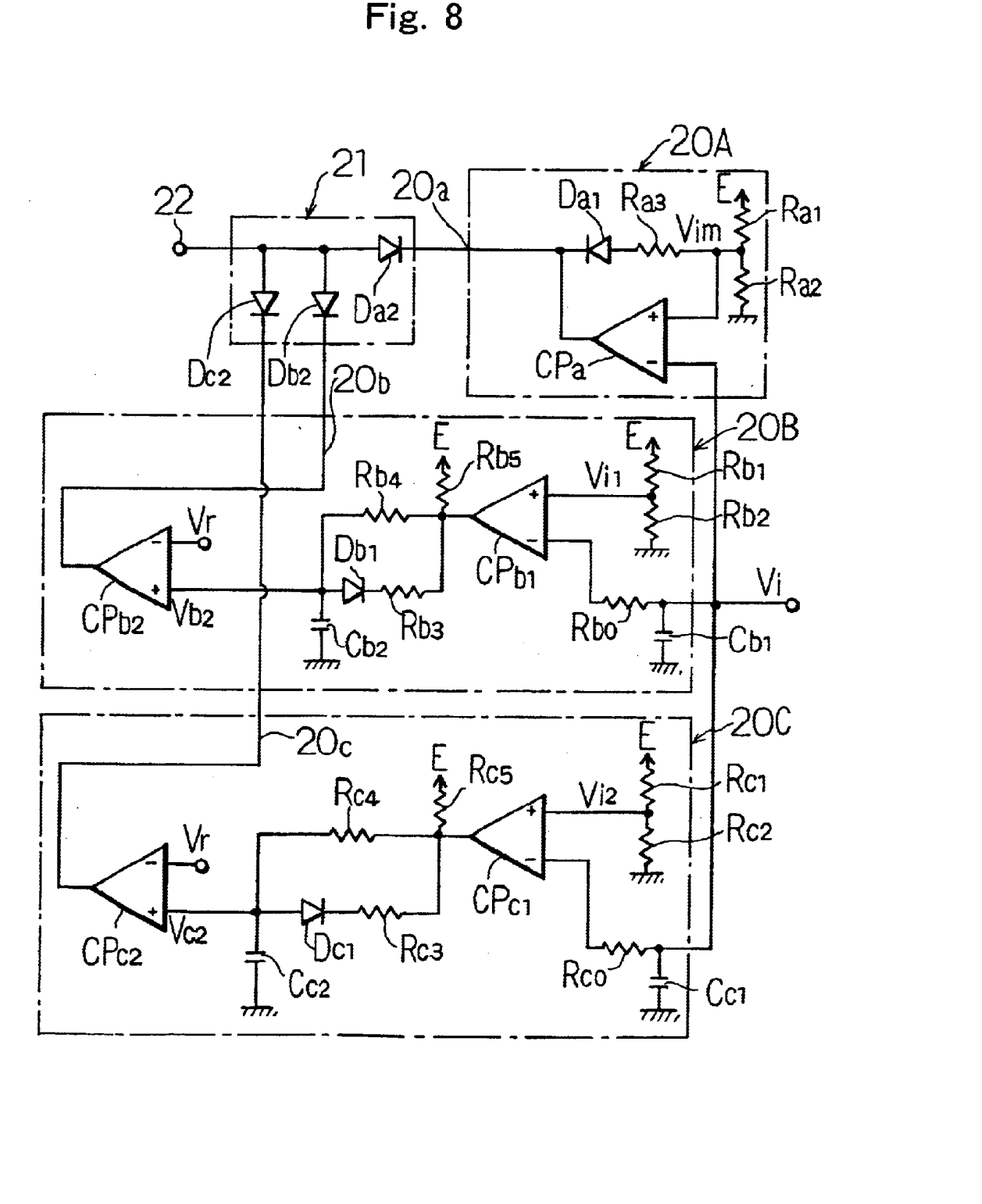
FIG. 8 is a schematic diagram of an example of a stop command generation circuit to generate an inverter stop command on overload by using a hardware circuit in the invention.

FIG. 8 illustrates the construction of the principal part of the inverter power generation apparatus adapted to perform the overload protection control in this manner.

In FIG. 8, an instant stop command generation circuit 20A serves to generate a stop command to instruct the inverter to be stopped immediately when it is detected that the load current detected by the load current detector exceeds the allowable threshold value by comparing the value of the load current with the allowable threshold value. A first overload stop command generation circuit 20B serves to generate a stop command to instruct the inverter to be stopped when the time interval operation is done for a setting time set in accordance with the first overload judgment value "i1" set at a value smaller than the allowable threshold value when it is judged that the load current "i" detected by the load current detector exceeds the first overload judgment value by comparing the load current with the first overload judgment value. A second overload stop command generation circuit 20C serves to generate a stop command to instruct the inverter to be stopped when the time limit operation is done for a setting time set in accordance with the second overload judgment value "i2" set at a value larger than the first overload judgment value "i1" when it is judged that the load current "i" detected by the load current detector exceeds the second overload judgment value by comparing the load current with the second overload judgment value.

The instant stop command generation circuit 20A comprises a comparator Cpa having an inversion input terminal to which the load current detection signal Vi is input and a divider circuit formed of a series circuit of resistors Ra1 and Ra2 to apply to a non-inversion input terminal of the comparator Cpa an allowable threshold value signal Vim obtained by dividing a power supply voltage E obtained from a DC constant voltage power supply circuit not shown and a resistor Ra3 connected between an output terminal of the comparator Cpa and the non-inversion terminal thereof through a diode Da1 having a cathode faced to the output terminal of the comparator Cpa. The output terminal of the comparator Cpa serves as an output terminal 20a of the instant stop command generation circuit 20A.

The first overload stop command generation circuit 20B comprises a comparator CPb1 having a non-inversion input terminal to which the load current detection signal Vi is applied through a resistor Rbo, a divider circuit formed of a series circuit of resistors Rb1 and Rb2 to apply to a non-inversion input terminal of the comparator Cpb1 a first overload judgment signal Vil obtained by dividing the power supply voltage E, a diode Db1 having a cathode connected through a resistor Rb3 to an output terminal of the comparator CPb1, a resistor Rb4 connected between an output terminal of the comparator CPb1 and an anode of the diode Db1, a resistor Rb5 connected between the output terminal of the comparator CPb1 and a positive output terminal of the DC constant voltage power supply circuit, a timer capacitor Cb2 between the anode of the diode Db1 and the ground and a comparator CPb2 having a non-inversion input terminal to which a voltage across the capacitor Cb2 is input and an inversion input terminal to which a reference voltage Vr is input. In the embodiment, an output terminal 20b of the first overload stop command generation circuit 20B is led out of an output terminal of the comparator CPb2.

The second overload stop command generation circuit 20C comprises a comparator CPc1 having an inversion input terminal to which the load current detection signal Vi is applied through a resistor Rco, a divider circuit formed of a series circuit of resistors Rc1 and Rc2 to apply to a non-inversion input terminal of the comparator Cpc1 a second overload judgment signal Vi2 (>Vil) obtained by dividing the power supply voltage E, a diode Dc1 having a cathode connected through a resistor Rc3 to an output terminal of the comparator CPc1, a resistor Rc4 connected between an output terminal of the comparator CPc1 and an anode of the diode Dc1, a resistor Rc5 connected between the output terminal of the comparator CPc1 and the positive output terminal of the DC constant voltage power supply circuit, a timer capacitor Cc2 connected between the anode of the diode Dc1 and the ground and a comparator CPc2 having a non-inversion input terminal to which a voltage across the capacitor Cc2 is input and an inverse input terminal to which the reference voltage Vr is input in the same manner as the first overload stop command generation circuit 20B. An output terminal 20c of the second overload stop command generation circuit 20C is led out of an output terminal of the comparator CPc2.

The output terminals 20a through 20c of the stop command generation circuits 20A through 20C are connected to cathodes of diodes Da2 through Dc2 forming an OR circuit 21, respectively and a stop command output terminal 22 is led out of a common connection point of anodes of the diodes Da2 through Dc2.

The instant stop command generation circuit 20A lowers the potential of the output terminal of the comparator CPa from a Hi level to a zero level when the load current detected by the load current detection signal Vi exceeds the allowable threshold value given by the allowable threshold value signal Vim to lower the potential of the stop command output terminal 22 to the zero level. The thus lowered potential of the stop command output terminal 22 is used as the stop command signal.

In the first overload stop command generation circuit 20B, when the load current detected by the load current detection signal Vi is equal to or less than the first overload judgment value given by the first overload judgment signal Vil, the output side of the comparator CPb1 is in the open state. At that time, since the capacitor Cb2 is charged to the power supply voltage E from the not shown power supply circuit through the resistors Rb5 and Rb4, the output side of the comparator CPb2 is in the open state.

As the load current detected by the load current detection signal Vi exceeds the first overload judgment value il (<im) set at a value smaller than the allowable critical value, the load current detection signal Vi gets higher than the first overload judgment value Vil and therefore the output side of the comparator CPb1 gets the on state. This causes the charge stored in the capacitor Cb2 to be discharged through the diode Db1, the resistor Rb3 and the output side of the comparator CPb1 with the fixed time constant. As the first setting time T1 elapses after the load current exceeds the first overload judgment value, the voltage across the capacitor Cb2 gets lower than the reference voltage Vr and therefore the output side of the comparator CPb2 gets the on state. This causes the potential at the stop command output terminal 22 to change from the Hi level state to the zero level state. This change in the potential at the stop command output terminal 22 becomes the stop command.

Similarly, in the second overload stop command generation circuit 20C, when the second setting time T2 elapses after the load current i exceeds the second overload judgment value i2 to get the state of Vi>V12, the voltage across the capacitor Cc2 is made lower than the reference voltage Vr. This causes the output side of the comparator CPc2 to become the on state. Thus, the potential at the stop command output terminal 22 is lowered to generate the stop command. The second setting time T2 is set at a value shorter than the first setting time T1.

The stop command output terminal 22 is connected to the stop command input terminal of the controller. The controller controls the CPU to practice the predetermined program when the stop command is output from the stop command output terminal 22 to stop supplying the drive signal to the switch circuit 5 so as to stop the operation of the inverter. By the OR circuit 21 and the step where the CPU stops the operation of the inverter in accordance with the stop command is formed inverter stop means to stop the operation of the inverter when the stop command is generated from either of the instant stop command generation circuit and the overload stop command generation circuits.

Figure 9:
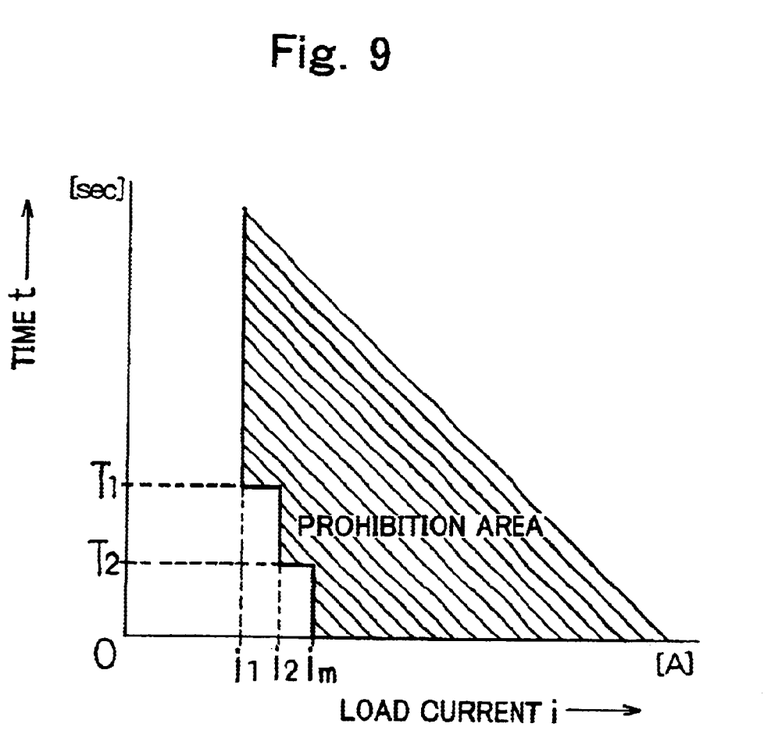
FIG. 9 illustrates the overload protection operation using the circuit of FIG. 8.

With the stop command generated by using the circuit illustrated in FIG. 8, when the first setting time T1 elapses after the overload is detected in the state where the load current "i" is equal to or more than the first overload judgment value "i1" and less than the second overload judgment value "i2", the operation of the inverter is stopped as shown in FIG. 9. When the second setting time T2 (<T1) elapses after the overload is detected in the state where the load current "i" is equal to or more than the second overload judgment value "i2" and equal to or less than the allowable threshold value "im", the operation of the inverter is stopped.

Furthermore, when the load current exceeds the allowable threshold value "im", the operation of the inverter is immediately stopped.

Thus, the induction load through which the large current flows when it starts can be driven without any trouble by setting the first overload judgment value "i1" at a value providing the minimum value of the overload range for the load other than the induction load. By setting the allowable threshold value at a proper value, the inverter stops immediately when the load connection terminals are shortened or close to the short circuit whereby the inverter can be positively protected.

Although, in the embodiment illustrated in FIG. 8, there are provided two overload stop command generation circuits, there may be provided three or more than three stop command generation circuits and set three or more than three overload judgment values whereby the inverter can be protected by the finer control.

The invention can be accomplished by providing a single overload stop command generation circuit in addition to the instant stop command generation circuit. In case that the single overload stop command generation circuit is provided, the overload judgment value set for the overload stop command generation circuit is set at a value providing the minimum of the overload range while the allowable threshold value set for the instant stop command generation circuit is set at a value higher than the peak value of the rush current flowing through the induction load when it starts.

In case that a plural of overload stop command generation circuits are provided, the times (the setting times) after they detect the load current having the value larger than the corresponding overload judgment value until the stop command is generated are so set as to get shorter as the overload judgment value used for the corresponding stop command generation circuit gets larger.

Although some preferred embodiments of the invention have been described and illustrated with reference to the accompanying drawings, it will be understood by those skilled in the art that they are by way of examples, and that various changes and modifications may be made without departing from the spirit and scope of the invention, which is defined only to the appended claims.

What is claimed is:

1. A method of overload-controlling an inverter power generation apparatus comprising an AC generator driven by an internal combustion engine, a rectifier to rectify an output of said AC generator and an inverter to convert an output voltage of said rectifier into an AC voltage of constant frequency, said method comprising steps of determining a first overload judgment value for a load current flowing through said inverter and a second overload judgment value larger than said first overload judgment value, determining a short circuit judgment value for an output voltage of said inverter, further determining a first setting time and a second setting time having a length set in accordance with said output voltage of said inverter, starting a measurement of an overload continuation time when it is detected that said load current exceeding said first overload judgment value flows through said inverter and judging whether the value of said load current exceeds said second overload judgment value and whether said output voltage of said inverter is equal to or less than said short circuit judgment value whereby the operation of said inverter is stopped immediately when said load current exceeds said second overload judgment value and said output voltage of said inverter is equal to or less than said short circuit judgment value, the operation of said inverter is stopped when said overload continuation time exceeds said first setting time in case that said load current is equal to or more than said first overload judgment value and is equal to or less than said second overload judgment value and the operation of said inverter is stopped when said overload continuation time exceeds said second setting time in case that said overload current exceeds said second overload judgment value and said output voltage of said inverter exceeds said short circuit judgment value wherein said second setting time is so set as to get shorter as said output voltage of said inverter is lower.

2. A method of overload-contolling an inverter power generation apparatus as set forth in claim 1 and wherein said first overload judgment value is the minimum value of said overload current allowed to flow through said inverter for said first setting time.

3. A method of overload-controlling an inverter power generation apparatus as set forth in claim 1 and wherein said first overload judgment value is the minimum value of the overload current allowed to flow through said inverter for said first setting time and said second overload judgment value is the maximum value of said overload current allowed to flow through said inverter for said first setting time.

4. A method of overload-controlling an inverter power generation apparatus as set forth in claim 1 and wherein said first setting time is so set at a constant value in spite of the value of said load current.

5. A method of overload-controlling an inverter power generation apparatus as set forth in claim 1 and wherein said first setting time is so set as to get shorter as said load current is larger.

6. A method of overload-controlling an inverter power generation apparatus as set forth in claim 1 and wherein said short circuit judgment value is so set at a value smaller than the minimum value of a voltage across a load when said load across output terminals of said generation apparatus is in the transition state when it starts.

7. An overload control apparatus for overload-controlling an inverter power generation apparatus comprising an AC generator driven by an internal combustion engine, a rectifier to rectify an output of said AC generator and an inverter to convert an output voltage of said rectifier into an AC voltage of constant frequency and to supply it to a load, said overload control apparatus comprising a load current detector to detect a load current flowing from said inverter through said load, overload signal generation means to generate an overload signal when the value of said load current detected by said overload current detector gets equal to or more than a first overload judgment value, overload continuation time measurement means to measure an overload continuation time corresponding to an elapse time after said overload signal is generated, overload current judgment means to judge whether said load current exceeds a second overload judgement value set at a value larger than said first overload judgment value when said overload signal is generated, short circuit judgment means to judge whether the output voltage of said inverter is equal to or less than a set short circuit judgment value when it is judged by said overload current judgment means that said load current exceeds said second overload judgment value, short circuit inverter protection means to stop the operation of said inverter immediately when it is judged by said short circuit judgment means that the output voltage of said inverter is equal to or less than said short circuit judgment value and overload inverter protection means to stop the operation of said inverter when said overload continuation time exceeds a first setting time in the state where it is judged by said overload current judgment means that the value of said load current is equal to or more than said first overload judgment value and is equal to or less than said second overload judgment value and when said overload continuation time exceeds a second setting time set in accordance with said output voltage of said invertor in the state where it is judged by said overload current judgment means that the value of said load current exceeds said second overload judgment value and it is judged by said short circuit judgment means that said output voltage of said inverter is higher than said short circuit judgment value wherein said second setting time is so set as to get shorter as said output voltage of said inverter gets lower.

8. An overload control apparatus for an inverter power generation apparatus as set forth in claim 7 and wherein said first overload judgment value is the minimum value of the overload current allowed to flow through said inverter for said first setting time.

9. An overload control apparatus for an inverter power generation apparatus as set forth in claim 7 and wherein said first overload judgment value is the minimum value of the overload current allowed to flow through said inverter for said first setting time and said second overload judgment value is the maximum value of the overload current allowed to flow through said inverter for said first setting time.

10. An overload control apparatus for an inverter power generation apparatus as set forth in claim 7 and wherein said first setting time is so set at a constant value in spite of the value of said load current.

11. An overload control apparatus for an inverter power generation apparatus as set forth in claim 7 and wherein said first setting time is so set as to get shorter as said load current is larger.

12. An overload control apparatus for an inverter power generation apparatus as set forth in claim 7 and wherein said short circuit judgment value ia so set at a value smaller than the minimum value of a voltage across said load when said load across output terminals of said power generation apparatus is in the transition state when it starts.

* * * * *